Figure 1:
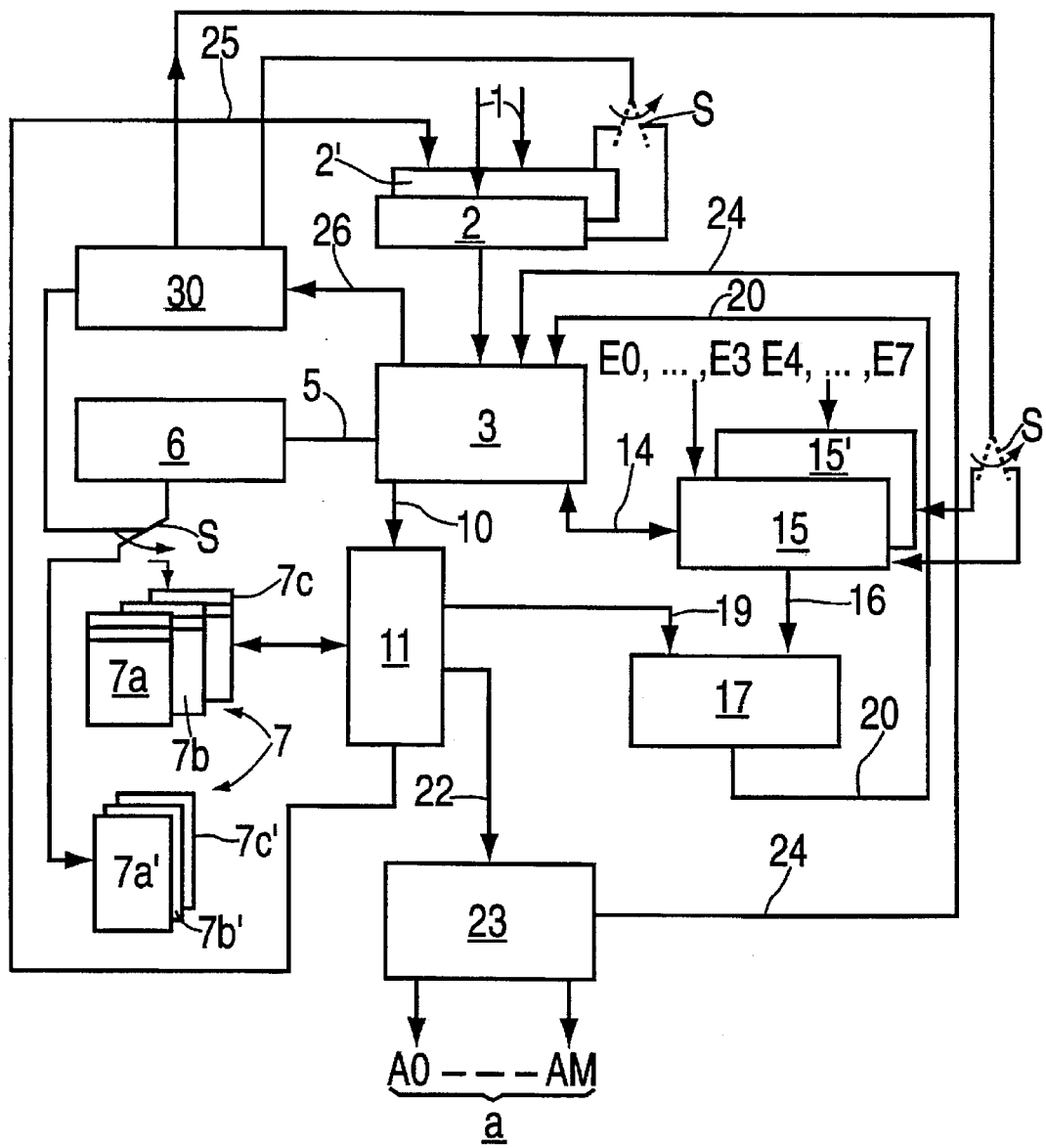

United States Patent [19]

Hallwirth

[11] Patent Number: 5,671,423
[45] Date of Patent: Sep. 23, 1997

[54] DEVICE FOR CONTROLLING THE SWITCHOVER OF PROCESSOR OPERATION FROM AN INSTANTANEOUS STATUS TO A SUBSEQUENT STATUS

[75] Inventor: Volker Hallwirth, St. Georgen, Germany

[73] Assignee: Siemens Aktiengesellschaft, München, Germany

[21] Appl. No.: 381,900

[22] PCT Filed: Jul. 27, 1993

[86] PCT No.: PCT/DE93/00665

§ 371 Date: Feb. 9, 1995

§ 102(e) Date: Feb. 9, 1995

[87] PCT Pub. No.: WO94/03848

PCT Pub. Date: Feb. 17, 1994

[30] Foreign Application Priority Data

Aug. 10, 1992 [DE] Germany ............... 42 26 456.1

[51] Int. Cl.$^6$ .................................................. G06F 9/22
[52] U.S. Cl. ............... 395/740; 395/800; 364/927.92; 364/933.62; 364/DIG. 2
[58] Field of Search ................... 395/740, 800, 395/733; 364/927.92, 933.62, DIG. 2

[56] References Cited

U.S. PATENT DOCUMENTS

| 4,336,588 | 6/1982 | Vernon et al. | 395/733 |
|---|---|---|---|
| 5,202,998 | 4/1993 | Yanes | 395/740 |
| 5,230,001 | 7/1993 | Chandra et al. | 371/27 |
| 5,321,603 | 6/1994 | Schwenke | 364/146 |

FOREIGN PATENT DOCUMENTS 37 43 438   6/1989   Germany .

OTHER PUBLICATIONS

Siemens A.G., Simatic S5, Programmierhandbuch für Ablaufsteuerungen mit S5–110A; Von Egon Edinger et al., 1983, 8 pages.

*Primary Examiner*—Alyssa H. Bowler
*Assistant Examiner*—John Harrity
*Attorney, Agent, or Firm*—Kenyon & Kenyon

[57] ABSTRACT

Proposed is a device which makes it possible to switch several processors from an instantaneous status to a follow-on status. The device is intended in particular for memory-programmable control units, referred to as memory-programmable status control units.

5 Claims, 2 Drawing Sheets

DEVICE FOR CONTROLLING THE SWITCHOVER OF PROCESSOR OPERATION FROM AN INSTANTANEOUS STATUS TO A SUBSEQUENT STATUS

Programmable controllers are often used to solve automation tasks, these controllers solving the automation task based on a control program stored in a memory. The program is customarily structured in the memory such that the corresponding processor in the programmable controller can execute this program serially.

A programmable controller of this sort is known from the "Siemens-Programmierhandbuch für Ablaufsteuerungen mit S5-110 A, SIMATIC S5", 1983["Siemens Programming Handbook for Sequence Control Systems with S5-110 A, SIMATIC S5", 1983]. A control program designed for binary signal processing is created with a programming device in a programming language and stored in a memory. During the operation of the controller, the individual instructions of the control program are, corresponding to execution with a Von Neumann machine, read out from memory one by one, interpreted and the corresponding operations (e.g., logic operations on the process input and output data) executed. Due to the serial execution of the control program, the reaction time to status changes in the input data is dependent on the program length and the execution time of each instruction.

In order to reduce the reaction time, it is advantageous to equip a programmable controller with a device known from the DE-OS 37 43 438. With this device, a switchover to a subsequent status and a transfer of new control data to an output stage is [are] brought about depending on a code stored in a status register for a current status and the input vector assignment of digital process input parameters. With this known device, a status switchover of only one processor can be controlled.

The underlying object of the present invention is to create a device of the type named in the introduction which allows a status switchover from an instantaneous status to a subsequent status for several processors.

This objective is solved by the measures specified in the characterizing part of claim 1.

In one refinement of the invention, the synchronization of the status switchovers of the different processor operating statuses is made possible by the fact that a status code is not loaded into one status register until a certain status code is stored in the other status register.

The device according to the invention is intended in particular for programmable controllers, referred to as programmable status controllers.

The invention is explained hereafter in greater detail based on an exemplary embodiment depicted in the drawing [drawings].

The following are shown:

FIG. 1 a block diagram of a controlling system according to the invention, and

Figure 2:
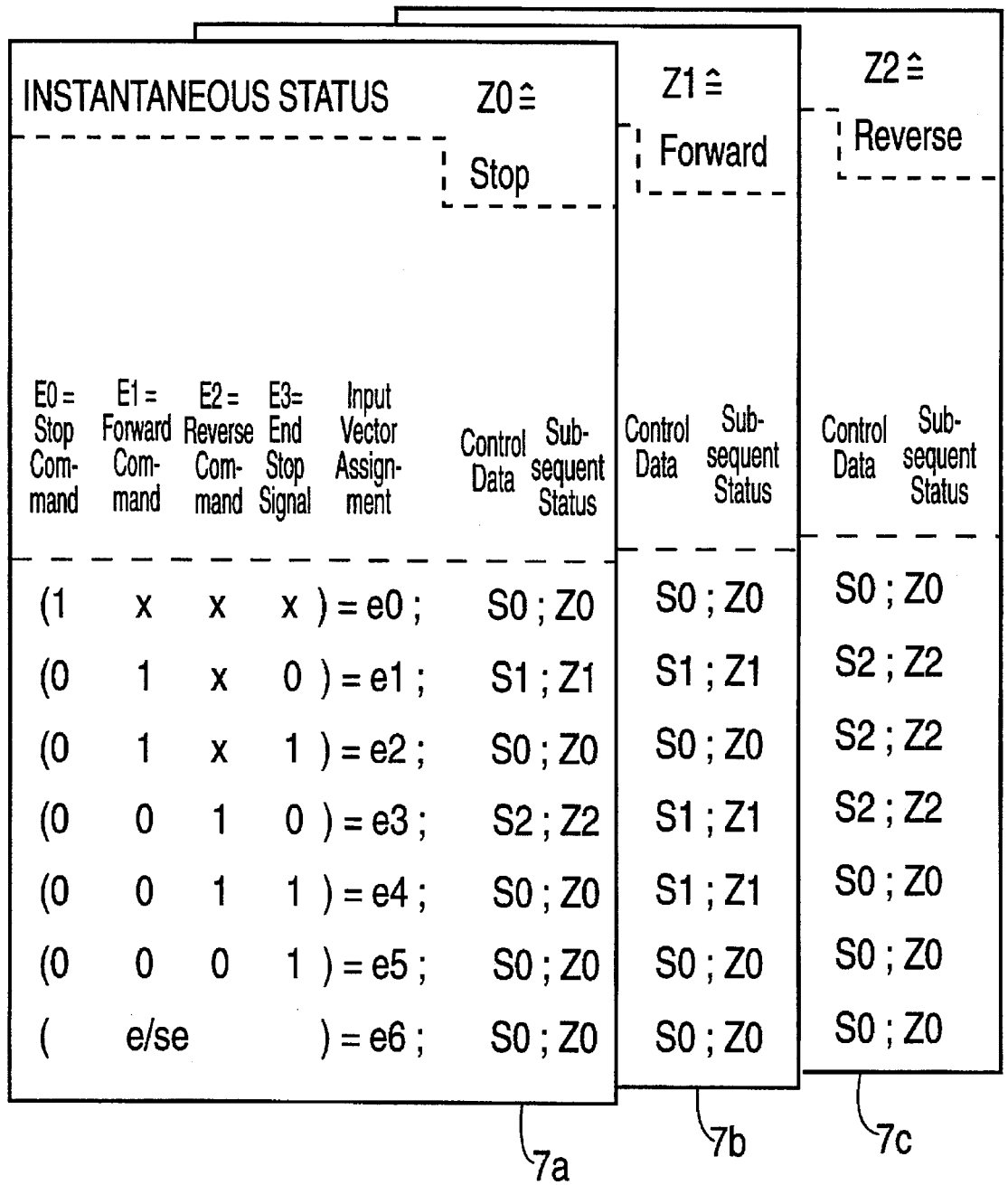

FIG. 2 a data set of selectable control data and subsequent status codes.

The controlling system according to FIG. 1 is used to control the switchover of processor operating statuses from an instantaneous status to a subsequent status. The instantaneous status with which the controlling system is put into operation can be any status of a processor. Thus, there is no loss of generality if the reset status is considered henceforth as the initial status of the controlling system.

On the signal path 1, the code Z0 of the instantaneous status is loaded from outside into the status register 2, or it is preset there on the basis of a reset signal. The control unit 3 receives the code Z0 from the status register 2 and causes via the signal path 5 to the page selector 6 in the data storage unit 7 the data storage area 7a (cf. FIG. 2) to activate, the data storage area 7a containing first [previously] generated control data S0, S1, S2 specific to the instantaneous status as well as codes Z0, Z1, Z2 for the subsequent statuses reachable from the instantaneous status.

The input stage 15 reports a change in at least one of the process input parameters E0 . . . which are taken into account, i.e., a switchover to a new input vector assignment, to the control unit 3 via the signal path 14 which control unit 3 causes in response via the signal path 10 the row selector 11 to select the subarea from the data storage area 7a activated in the data storage unit 7 which subarea contains the control data S0, S1 or S2 specific to the new input vector assignment and the code Z0, Z1 or Z2 of the subsequent status determined by the new input vector assignment.

In order to illustrate the selection of the data storage area 7a and the subarea, parallel reference will be made to FIG. 2. There, the data storage areas 7a, 7b, 7c are symbolically represented as pages which respectively characterize in full the control cases possible in an instantaneous status. This example is based on an (electric) motor as the process to be controlled, which motor can assume the (encoded) statuses Z0=Stop, Z1=Forward movement, Z2=Reverse movement. The (boolean) process input parameters are E0=Stop command, E1=Forward movement command, E2=Reverse movement command, E3=End stop signal (e.g. range end in a positioning or transport mechanism or the like). In more complicated motor control units, further parameters such as speed of rotation, torque, current and voltage come into play alongside of the digital process input parameters in the general case.

The process input parameters E0 . . . E3 are considered first. The process input parameters E0 . . . E3 are combined into the relevant input vector assignments e0 . . . e6, the number of these being distinctly less than the arithmetic maximum number of $2^4=16$. (This generally observed characteristic of control tasks simplifies the generation of complete description data sets.) This number also, and not only the width, of the relevant input vector assignments can be different from instantaneous status to instantaneous status in the general case.

In the instantaneous status having the code Z0, the data storage area 7a is thus activated. If, for example, the new input vector assignment e3 now occurs, the control unit 3 causes the row selector 11 to select the subarea specific to this new input vector assignment e3 (here, the corresponding row of the data storage area 7a) in order to reach the control data S2 previously generated and applying to this control case and the code Z2 of the subsequent status. Here, too, it should be noted for the sake of completeness that the control data for reaching a specific subsequent status are dependent in the general case on the instantaneous status as well as the input vector assignment.

The selection of the subarea specific to the new input vector assignment e3, i.e., the corresponding row of the data storage area 7a, can happen in such a manner that the input vector assignment e3 is translated into a row address, thereby allowing direct access to the row. In cases where this is not possible, e.g., due to the fact that no absolute row addresses are available or they are continually changing as a result of a data set transfer within the data storage unit 7 or between the data storage unit 7 and any background storage units, the desired row is determined through successive comparison of the input vector assignments e0 . . . e6 stored in the data storage area 7a with the new input vector assignment e3. For this purpose, the row selector 11 transmits the stored input vector assignments e0 up to a maximum of e6 in order via the signal path 19 to the comparator 17. This can include information on the masking of individual vector elements whose value is irrelevant in the respective configuration of the process input parameters E0 ... E3. For example, a Stop command E0=1 should have absolute priority, i.e., it should trigger a shut-down regardless of all other process input parameters E1, E2, E3. Thus, the values of the process input parameters E1, E2, E3 are marked with a "x" in the data storage area 7a in the row of the input vector assignment e0.

As soon as the comparator 17 finally establishes equality between the stored input vector assignment e3 and the new input vector assignment e3 applied via the signal path 16, the comparator 17 informs the control unit 3 of this via the signal path 20, which control unit 3 then causes the row selector 11 on the one hand to transfer the control data S2 of the found row via the signal path 22 to the output vector generator 23 and on the other hand to load the subsequent status code Z2 of the found row via the signal path 25 into the status register 2.

The output vector generator 23 generates the control or actuating signals A0 ... AM of the output vector a from the control data S2. In the simplest and fastest case, this can signify [result in] the direct output of the received control data S2. In the most general case, the output vector generator 23 is a data processing unit to which certain parameter values as well as the initial address of a program part [segment] are transferred in the form of the control data S2, the processing of the program segment finally yielding the actual control and actuating signals A0 ... AM. This method allows optimization between data set volume and cycle time. The successful generation of the output vector a is acknowledged to the control unit 3 via the signal path 24.

The control data S2 or rather the associated output vector a bring about in the motor control unit selected as an example a switchover to the subsequent status having the code Z2, i.e., reverse movement of the motor, by triggering appropriate actuators—e.g., contactors or semiconductor switches—to supply the motor with current of the required polarity. Control data S1, as a response to a new input vector assignment e1, bring about from the initial status a switchover to forward movement of the motor, whereas control data S0 respectively result in a stopping of the motor, i.e., the motor current is switched off.

The code Z2 of the subsequent status is already in the status register 2. The data storage area 7c specific to this status—the data set page having the code Z2—can now be activated preferably immediately or otherwise not until the next new input vector assignment is received, and a new cycle follows. Its temporal length—just like the duration of all other cycles of the same or another control problem—corresponds to the greatest possible extent to that of the above described cycle since it is always necessary to call up and output only ready or almost ready sets of control data S0, S1 or rather S2. Besides the high speed of generation of the control data, thus, there is also the advantage of a quasi-constant cycle time.

To make it possible for an operating status of a further processor to be executed [processed] by the controlling system, a further status register 2', a further input stage 15', a changeover device 30 and further memory areas 7a', 7b' and 7c' are provided according to the invention. During the switchover of the operating status of a processor from an instantaneous status to the subsequent status, the control unit 3 brings about via the changeover device 30 using appropriate switches S the initiation of the switchover of the operating status of the further processor from a current instantaneous status to a subsequent status. The changeover device 30 switches for this purpose from the status register 2 to the status register 2', from the storage areas 7a, 7b, 7c to the storage areas 7a', 7b', 7c' and from the input stage 15 to the input stage 15'. Based on the instantaneous status stored in the status register 2' and the process input data E4 ... E7, the switchover from the instantaneous status (Z0, Z1, Z2) to a subsequent status (Z0, Z1, Z2) is brought about in accordance with the manner described above, the control data associated with the process input data E4 ... E7 and the respective subsequent status also being stored in storage unit 7 in the storage areas 7a', 7b', 7c'. For the purpose of synchronizing the status switchovers of the different processor operating statuses, a status code in one of the two status registers 2, 2' is not loaded until a specific status code is stored in the other status register.

I claim:

1. A device for controlling the switchover of processor operation from an instantaneous status to a subsequent status, comprising:
   a) at least two input stages to which respectively associated input parameters are fed and which select input parameters relevant to the respective instantaneous status as a current input vector from a totality of the current incoming input parameters associated with them;
   b) at least two processor status resisters for storing a code for the instantaneous status or the subsequent status;
   c) a data storage unit which is divided at least into a first and a second group of storage areas, each storage area being associated with one instantaneous status and consisting of several subareas in which in each case a subsequent status code and control data are stored and which are each associated with an instantaneous status and input parameters;
   d) a changeover device which brings about a switchover between the input stages, the storage area groups and between the status registers during the status switchover of a processor;
   e) a selection device which, based on the switching position of the changeover device, the current input vector and the instantaneous status code, reads out the subarea of the storage area which is contained in the storage area associated with the instantaneous status and associated with the current input vector.

2. The device according to claim 1, wherein for the purpose of synchronizing the status switchovers of the different processor operating statuses, a status code in one of the two status registers is not loaded until a specific status code is stored in the other status register.

3. A programmable controller having a device for controlling the switchover of processor operation from an instantaneous status to a subsequent status, said device comprising:
   a) at least two input stages to which respectively associated input parameters are fed and which select input parameters relevant to the respective instantaneous status as a current input vector from a totality of the current incoming input parameters associated with them;
   b) at least two processor status registers for storing a code for the instantaneous status or the subsequent status;
   c) a data storage unit which is divided at least into a first and a second group of storage areas, each storage area being associated with one instantaneous status and consisting of several subareas in which in each case a subsequent status code and control data are stored and which are each associated with an instantaneous status and input parameters;

d) a changeover device which brings about a switchover between the input stages, the storage area groups and between the status registers during the status switchover of a processor;

e) a selection device which, based on the switching position of the changeover device, the current input vector and the instantaneous status code, reads out the subarea of the storage area which is contained in the storage area associated with the instantaneous status and associated with the current input vector.

4. The programmable controller according to claim 3, wherein for the purpose of synchronizing the status switchover of the different processor operating statuses, a status code in one of the two status registers is not loaded until a specific status code is stored in the other status register.

5. A device for controlling the switchover of processor operation from an instantaneous status to a subsequent status, said device comprising:

a) a status storage device for storing a status code;

b) a data storage unit which is divided into areas which are each associated with an instantaneous status and include several subareas, which are each associated with an input vector and in which in each case a subsequent status code and control data are stored which are read out depending on the respective instantaneous status and the current input vector, the input vectors in the data storage unit being the combinations specifiable for the respective instantaneous status of the input parameters specifiable for the instantaneous status;

c) an input device to which the current input parameters are fed and which selects the input parameters specified for the respective instantaneous status as the current input vector from the totality of the current incoming input parameters;

d) a selection device which, based on the current input vector and the instantaneous status, reads out the subarea of the data storage unit which is contained in the area associated with the instantaneous status and associated with the current input vector;

e) wherein the data storage unit is divided at least into a first and a second group of storage areas, the input device has at least two input stages, the status storage device has at least two status registers, in each case a status register, an input stage and a group of storage areas are associated with a processor; and f) a changeover device is provided which brings about a switchover between the input stages the storage area groups and between the status registers during the status switchover of a processor.

* * * * *